United States Patent [19]

Séguenot

[11] Patent Number: 4,511,150
[45] Date of Patent: Apr. 16, 1985

[54] DEVICE PROVIDING AN EFFECTIVE SEAL FOR A SPHERICAL ROTARY SLIDE VALVE

[75] Inventor: Gabriel Séguenot, Neuilly-sur-Seine, France

[73] Assignee: Societe Nouvelle Auxim (Societe Anonyme), Saint-Etienne, France

[21] Appl. No.: 501,981

[22] Filed: Jun. 7, 1983

[30] Foreign Application Priority Data

Jun. 7, 1982 [FR] France ................ 82 10085

[51] Int. Cl.³ .............. F16K 5/06; F16K 5/20; F16J 15/48
[52] U.S. Cl. .................... 277/12; 277/27; 251/171; 251/172; 251/175
[58] Field of Search .......... 277/3, 12, 27, 32; 251/171–173, 175

[56] References Cited

U.S. PATENT DOCUMENTS

| 2,653,004 | 9/1953 | Schnyder ............... 251/172 |
| 2,845,247 | 7/1958 | Housekeeper et al. ............ 251/171 |
| 2,916,254 | 12/1959 | Wendell . |
| 3,556,476 | 1/1971 | Haenky ............... 251/171 X |
| 3,722,859 | 3/1973 | Murphy . |
| 4,286,614 | 9/1981 | Kacal . |

FOREIGN PATENT DOCUMENTS

| 167771 | 2/1951 | Austria ................ 251/172 |
| 520188 | 3/1931 | Fed. Rep. of Germany ...... 251/172 |
| 1943985 | 1/1971 | Fed. Rep. of Germany ...... 251/175 |
| 2131643 | 1/1973 | Fed. Rep. of Germany ...... 251/172 |
| 2196699 | 3/1974 | France . |
| 178131 | 2/1962 | Sweden ................ 251/172 |
| 716610 | 10/1954 | United Kingdom . |
| 2023773 | 1/1980 | United Kingdom ........... 251/175 |

Primary Examiner—Robert S. Ward
Attorney, Agent, or Firm—Karl F. Ross; Herbert Dubno

[57] ABSTRACT

A ball-type valve comprises a rotary valve member in a housing or valve body whose ducts communicating with the passage in the valve member are provided with respective sealing devices. These sealing devices comprise elastomeric formable rings received in blind recesses around the respective ducts and communicating therewith by orifices opening behind each deformable ring so that the fluid pressure in the respective duct under pressure will urge the deformable ring against the annular gasket and press the gasket against the rotary valve member.

12 Claims, 6 Drawing Figures

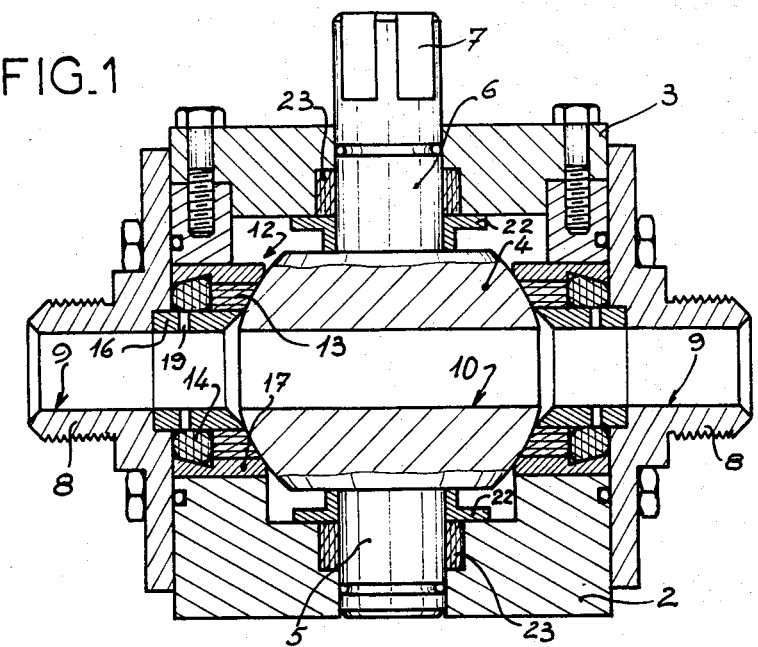
FIG. 1
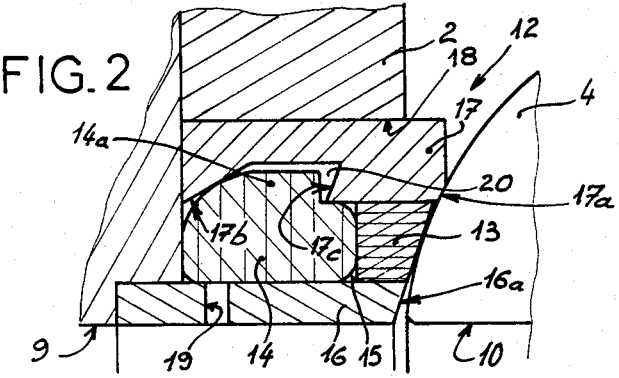
FIG. 2
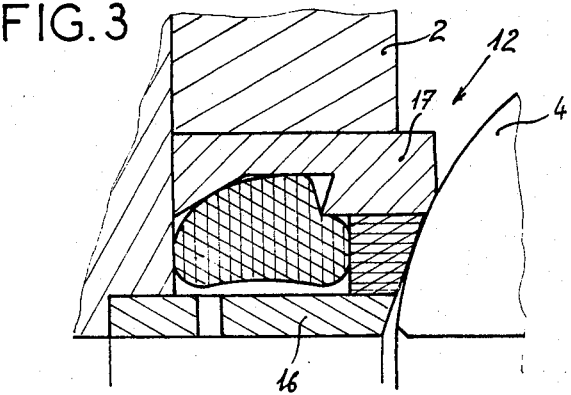
FIG. 3
FIG. 4

DEVICE PROVIDING AN EFFECTIVE SEAL FOR A SPHERICAL ROTARY SLIDE VALVE

FIELD OF THE INVENTION

The invention relates to a device providing an effective seal for a spherical rotary slide valve.

BACKGROUND OF THE INVENTION

An effective seal must be provided between the valve body; and the rotary slide of such a valve, associated with each of the ducts provided in the body, to allow the passage of the fluid and can have means capable of making a tight contact with the rotary slide. The devices with which the invention is concerned are those having an annular gasket pressed against the rotary slide by the hydrostatic pressure of the fluid. In known devices of this type the gasket is part of an assembly movable by the fluid pressure and having generally the shape of an annular piston located around the corresponding duct. This construction is cumbersome and difficult to use for small-section valves. In addition, the movements of the rigid assembly are affected by friction so that the force applied to press the sealing gasket against the rotary slide is not entirely proportional to the hydrostatic pressure and leaks can occur.

OBJECT OF THE INVENTION

The object of the present invention is to create a device providing an effective seal, of a simple construction, adaptable even to small-size spherical rotary slide valves and ensuring a perfect tightness, regardless of the pressure.

SUMMARY OF THE INVENTION

In the device of the invention the means reacting to the hydrostatic pressure are constituted by at least one ring of a material elastically deformable under pressure, located at the bottom of a blind annular recess, said recess communicating with a corresponding fluid-passage duct within the body or housing of the valve, the ring being located between the bottom of this recess and the annular gasket.

When at least one of the ducts of the valve is subjected to hydrostatic pressure of the fluid, the deformable ring is deformed by this pressure and transmits to the annular gasket a force proportional to the hydrostatic pressure resulting in a tendency to tighten even more said gasket against the rotary slide. The annular gasket and the deforming ring create in this way an assembly with a continuously effective and deformable seal which also is not cumbersome.

In one of the embodiments the annular recess is limited by two guiding rings, respectively, an inner one and an outer one, having their free extremities bevelled and close to the rotary slide but without touching said slide, whereby the outer guiding ring is mounted with the possibility of longitudinally moving within the casing, while the inner ring is fitted in said casing and constitutes or is provided with the duct for the passage of the fluid.

These two rings facilitate the construction of the valve body and ensure residual tightness in case of destruction of the gaskets by fire, provided that at least one of the rings is made of metal.

Advantageously, the outer ring comprises in the vicinity of the bottom of the annular recess a sloped surface creating a support chamfer for the deformable ring.

When the deformable ring is deformed by pressure it comes to rest on the mentioned chamfer and transmits to the outer ring slidably mounted within the body a force having the tendency to hold the outer ring away from the rotary slide. This arrangement prevents the outer ring from making contact under pressure with the rotary slide, which would increase the tightening thereof and consequently the torque required for operating the same.

BRIEF DESCRIPTION OF THE DRAWING

Other features and advantages will be shown by the following description with reference to the attached schematic drawing, representing by way of a non-limiting example, an embodiment of the device in the case of a shaft-provided rotary slide. In the drawing:

FIG. 1 is a view in longitudinal section of the valve assembly;

FIGS. 2 and 3 are enlarged detail views of the device providing an effective seal, respectively, at rest and when it is subjected to hydrostatic pressure, FIG. 4 is a sectional view showing another embodiment of the transversal section of the deformable ring.

SPECIFIC DESCRIPTION

Figure 5:
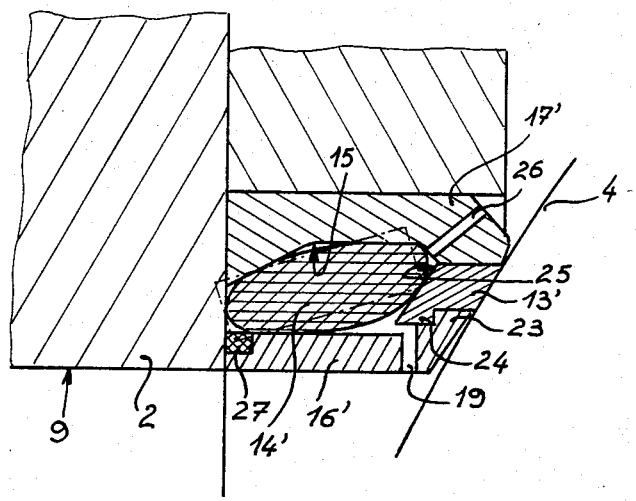
FIG. 5 is a partial sectional view of another embodiment of the device.

This valve comprises as commonly known a body 2 asoociated with a cap 3 and a rotary slide 4. This rotary slide is joined to two shaft ends, respectively 5 mounted freely for rotation in the body and 6 mounted freely for rotation in the cap. The shaft end 6 traverses the cap, ending with a square drive portion meant to cooperate with an actuating means. On the body 2 connecting flanges 8 are mounted, each having an inner duct 9 for the passage of the fluid. The rotary slide 4 has also at least one inner duct 10 which can be brought in line with the ducts 9 of the above-mentioned flanges. The tightness between the body and the rotary slide is insured via a device referred to in a general manner as 12.

According to the invention and as shown in more detail in FIG. 2, this device for providing an effective seal comprises an annular gasket 13 located together with a ring 14 made of an elastically deformable material in an annular recess provided around the corresponding duct for the passage of the fluid. The annular sealing gasket 13 is made of synthetic material of the plastomer type while the deformable ring 14 is made of a synthetic material of the elastomer type.

In the embodiment presented the annular recess containing the gasket 13 and the ring 14 is limited by an inner ring 16 and an outer ring 17. The inner ring 16 is made of metal and in this embodiment is fitted in the connecting flanges 8. The outer ring 17 which is made of synthetic material of the plastomer type is located in a bore 18 of the body meaning that it can slide with regard to said body.

The inner ring 16 insures the guiding of the annular gasket 13 and counteracts its possible extrusion under pressure. For this purpose the play existing between its free extremity 16a and the rotary slide 4 is very reduced. The ring 16 has also one or more ducts 19 making the connection between the duct 9 for passage of the fluid and the annular recess 15. This duct is located to communicate with the portion of the annular recess 15 containing the deformable ring 14 which in turn has a cross section greater than the cross section of the annular gasket 13. The ring 17 insures the same functions as the ring 16. At the same time it has at its free extremity a chamfer 17a creating a conical portion capable of reaching a sliding contact with the rotary slide 4.

In this device the tightness is insured by the difference in pressure existing between the inlet port of the fluid and the internal operational volume of the valve, namely, by the difference in pressure on both sides of the continuous and deformable sealing assembly comprising the annular gasket 13 and the deformable ring 14. In this way, when one of the ducts 9 for the passage of the fluid is subjected to the hydrostatic pressure of the fluid, this pressure is applied via ducts 19 directly against the deformable ring 14. Under the effect of the pressure the ring changes its shape as shown in FIG. 3. This deformation increases its bearing against the bottom of the annular recess 15 but also and mainly against the gasket 13, which is thereby pressed against the rotary slide with a force proportional to the hydrostatic pressure of the fluid entering the valve.

When on the contrary the connecting port is at the exiting end, the pressure existing in the operational volume of the valve reaches the annular recess 15 due to the play between the outer ring 17 and the bore 18 of the body, thereby acting upon the deformable ring 14. The latter is radially compressed against the inner ring 16 and in the afore-described manner, exerts a force on the annular gasket 13 with a tendency to press said gasket against the spherical rotary slide in order to insure sealing. It is to be noted that if necessary and especially in the case of valves working at low pressure, the play existing between the outer ring 17 and the body 18 can be increased. For the same reasons ducts or grooves can be provided in the ring 17 to facilitate the access of the pressure to the annular recess 15.

Advantageously, in order to prevent the outer ring 17 from moving towards the rotary slide 4 when the deformable ring 14 changes its shape under pressure and, in other words, to prevent the ring 17 from coming to bear against the rotary slide thereby increasing the resisting torque opposing the rotation of the rotary slide, the ring 17 has in its rear portion in the vicinity of the bottom of the annular recess a sloped support surface 17b for the deformable ring 14. This way, when the ring changes its shape and while it has a tendency to push the annular gasket 13 against the rotary slide it concurrently transmits to the ring 17 a counter-directional force with the tendency to remove this ring from the rotary slide 4.

In the embodiment represented in FIGS. 2 and 3, the deformable ring 14 comprises a peripherical collar 14a capable of fitting into a recess 20 of the ring 17. This recess has two lateral surfaces sloped in the direction of the bottom of the annular recess 15, namely the aforementioned surface 17b and a surface 17c which in this embodiment is less sloped than in the previous embodiment. The size of this recess is such that the collar 14a can not in any case make contact with the surface 17c with the purpose that under the effect of the deformation of the ring 14 the outer ring 17 be subjected exclusively to a force tending to remove it from the rotary slide 4.

In the embodiment represented in FIG. 4, the deformable ring 14 comprises a front surface 14b and a rear surface 14c which are concave with the purpose of facilitating its deformation under the effect of the hydrostatic pressure.

It has to be noted that the effective seal at the shaft ends 5 and 6 of the rotary slide is obtained by deformation of a lipped gasket 22 bearing against a centering ring 23 which reduces the friction of the rotary slide and facilitates its operation.

This sealing device also satisfies the fire safety regulations because in the case of fire and destruction of the gasket 13, of deformable ring 14 and the outer ring 17, the inner metallic ring 16 same as the outer ring 17, by coming very close to the rotary slide 4 but without touching it insures residual sealing in the practical conditions of fire-safe sealing when applied to oil.

It is obvious that the invention is not limited to the sole aforedescribed embodiment; it embraces on the contrary all the variations in construction comprising equivalent means, especially as to the shape of the cross section of the ring 14 and the internal structure of the different components. For instance the outer ring 17 made of plastomer in the embodiment described can be reinforced with metal or even made entirely of metallic material.

The embodiment shown in FIG. 5 is different from the previous in that the inner ring 16' is mounted to freely travel within the body 2 the same as the outer ring 17'. In addition, this inner ring 16' is translatorily connected to the gasket 13'. This connection is insured by a collar 23 of the ring 16', capable of cooperating with a collar 24 of the gasket 13'. Besides, the deformable ring 14' in rest position has the shape of a ring with a rectangular cross section. This ring is placed in the recess 15 created between the rings 16' and 17' and bordered transversely by a diametral wall of the body 2 and by a sloped surface 25 of the gasket 13'. Due to this arrangement the deformable ring 14' bears with two of its opposed rounded angles against respectively the diametral surface of the body 2 and the surface 25 of the annular gasket 13'.

The ring 14' is made of a synthetic material of the elastomer type while the annular gasket 13' is made of a synthetic material of the plastomer type and the two guiding rings 16' and 17' are made of rigid and non-deformable materials, metallic or synthetic.

As in the previous embodiment the inner ring 16' has a duct 19 through which the recess 15 can communicate with the duct for the passage of the fluid. For the same purpose, the outer ring 17' is provided with a duct 26 permitting the communication between the recess 15 and the internal portion of the valve.

The inner ring 16' has a recess for a gasket of a square cross section 27 kept in place by the deformable ring 14' and constituting an anti-extrusion ring.

Due to this construction the sealing device forms practically a compact unit which facilitates the handling and the mounting thereof within the body of the valve.

Figure 6:
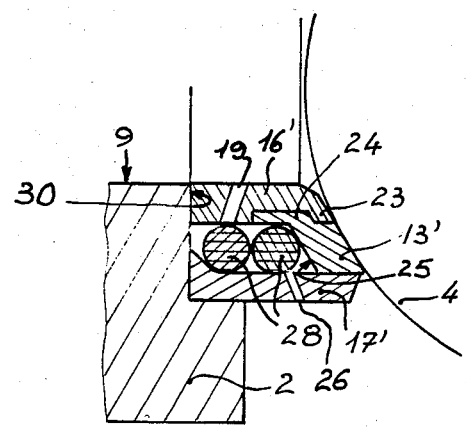
FIG. 6 shows a different way of constructing the device shown in FIG. 5.

In a variation of the embodiment shown in FIG. 6, the deformable ring comprises at least two toroidal gaskets 28 which even in the absence of pressure are in a leakproof contact with each other and the faces of the annular recess 15.

Except for these differences, the device is similar to the one shown in FIG. 5 and gives excellent results.

It is to be noted that in all these devices the deformation of the sealing means occurs only in the deformable materials of the elastomer type and are not sensitive to the phenomena of hydraulic plating affecting the metallic surfaces, as it happens with common devices.

We claim:

1. In a sealing device for a valve with a spherical rotary valve member of the type in which an effective seal between a valve body and the rotary valve member is insured by means arranged within the body around ducts provided in said body for passage of the fluid each include an annular gasket capable of being pressed against the rotary valve member by means reacting to the hydrostatic pressure, the improvement wherein the means reacting to the hydrostatic pressure are constituted by at least one ring of a material elastically deformable under pressure, located at the bottom of a blind annular recess formed in said body and communicating with the corresponding duct for passage of the fluid and between the bottom of the recess and engaging and pressed against the annular gasket to form a continuous sealing assembly therewith.

2. The improvement defined in claim 1, wherein the deformable ring has a larger cross section than that of the gasket against which it is pressed.

3. The improvement defined in claim 1 wherein said annular recess has a wall separating the latter from the respective duct and traversed in its portion receiving the deformable ring by at least one communication orifice.

4. The improvement defined in claims 1 to 3 wherein said annular recess is limited between two guiding rings having free bevelled extremities approaching said rotary member but without touching it, an outer guiding ring being mounted within the body with the possibility of longitudinal travel, while an inner one of said guiding rings is fitted in said body.

5. The improvement defined in claims 1 to 3 wherein said annular recess is limited between two guiding rings including an inner guiding ring mounted together with an outer guiding ring with the possibility of longitudinal travel within the body, further comprising means translatorily connected with the annular gasket, said annular gasket is being provided on a rear portion thereof with an inclined surface for contact with the deformable ring.

6. The improvement defined in claim 5 wherein the deformable ring has in rest position the shape of a ring with a rectangular cross section and in a mounted state bears with two of opposed rounded angles upon respectively a diametral surface of the body and upon an inclined face of the annular gasket.

7. The improvement defined in claim 5 wherein the deformable ring is constituted by at least two toroidal gaskets in sealing contact with each other and with the surfaces limiting the annular recess even in the absence of pressure.

8. The improvement defined in claim 4 wherein the outer ring comprises in the vicinity of the bottom of the annular recess a sloped surface forming a bearing chamfer for the deformable ring.

9. The improvement defined in claim 4 wherein the deformable ring is provided with a peripheral collar capable of fitting into a recess provided in the outer ring and which comprises two lateral faces sloped in the direction of the bottom of the annular recess, a lateral face closest to the said bottom constituting the sole support surface for the deformable ring.

10. The improvement defined in claim 1 wherein the deformable ring is made of an elastomer, while the annular gasket is made of plastomer.

11. The improvement defined in claim 4 wherein the outer ring is made of plastomer while the inner ring is metallic.

12. The improvement defined in claim 1 wherein a frontal surface and a rear surface of the deformable ring are concave.

* * * * *